(12) United States Patent
Yamasaki et al.

(10) Patent No.: US 11,989,222 B2
(45) Date of Patent: May 21, 2024

(54) CLUSTER ANALYSIS METHOD, CLUSTER ANALYSIS SYSTEM, AND CLUSTER ANALYSIS PROGRAM

(71) Applicant: AIXS, INC., Tokyo (JP)

(72) Inventors: Kunitoshi Yamasaki, Tokyo (JP); Ryuichi Hosoya, Tokyo (JP)

(73) Assignee: AIXS, INC., Tokyo (JP)

( * ) Notice: Subject to any disclaimer, the term of this patent is extended or adjusted under 35 U.S.C. 154(b) by 199 days.

(21) Appl. No.: 17/595,151

(22) PCT Filed: May 17, 2019

(86) PCT No.: PCT/JP2019/019725
§ 371 (c)(1),
(2) Date: Nov. 10, 2021

(87) PCT Pub. No.: WO2020/234930
PCT Pub. Date: Nov. 26, 2020

(65) Prior Publication Data
US 2022/0222287 A1 Jul. 14, 2022

(51) Int. Cl.
*G06F 7/02* (2006.01)
*G06F 16/00* (2019.01)
(Continued)

(52) U.S. Cl.
CPC .......... *G06F 16/355* (2019.01); *G06F 16/383* (2019.01); *G06F 18/22* (2023.01)

(58) Field of Classification Search
CPC ............. G06F 16/9535; G06F 16/2428; G06F 16/9538; G06F 16/2465; G06F 16/35; G06F 16/355; G06F 16/383; G06Q 30/016
See application file for complete search history.

(56) References Cited

U.S. PATENT DOCUMENTS

| 9,836,183 B1 | 12/2017 | Love et al. |
| 2013/0212106 A1* | 8/2013 | Inagaki ................. G06F 16/355 707/736 |

(Continued)

FOREIGN PATENT DOCUMENTS

| JP | 10-154150 | 6/1998 |
| JP | 2000-242652 | 9/2000 |

(Continued)

OTHER PUBLICATIONS

Nourashrafeddin, Seyednaser et al., "A Visual Approach for Interactive Keyterm-Based Clustering," ACM Transactions on Interactive Intelligent Systems (TIIS), vol. 8 No. 1, Feb. 2018, pp. 1-35 (Year: 2018).*

(Continued)

*Primary Examiner* — Bruce M Moser
(74) *Attorney, Agent, or Firm* — HSML P.C.

(57) ABSTRACT

A server 4 executes a set extracting step (S1) of extracting a set from a plurality of documents according to a condition using time information, an inter-document similarity calculation step (S2) of calculating inter-document similarity between content of one document and content of another document included in the set, a cluster classifying step (S3) of classifying documents that are similar based on the inter-document similarity in the set into a plurality of clusters, an inter-cluster similarity calculation step (S6) of calculating inter-cluster similarity between clusters of a plurality of sets, and a cluster associating step (S7) of generating association information in which clusters that are relevant are linked to each other over sets based on the inter-cluster similarity.

6 Claims, 6 Drawing Sheets

(51) Int. Cl.
G06F 16/35 (2019.01)
G06F 16/383 (2019.01)
G06F 18/22 (2023.01)

(56) References Cited

U.S. PATENT DOCUMENTS

2016/0314184 A1* 10/2016 Bendersky .............. G06F 16/35
2019/0220695 A1* 7/2019 Nefedov ............... G06F 16/285

FOREIGN PATENT DOCUMENTS

JP 2005-092443 4/2005
JP 2011-086032 4/2011

OTHER PUBLICATIONS

Huang, Anna, "Similarity Measures for Text Document Clustering," New Zealand Computer Science Research Student Conference, Apr. 2008. (Year: 2008).*
Sano, et al., "Integrating cross-language hierarchies and its application to relevant document extraction", IPSJ SIG Technical Report, vol. 2007, No. 47, pp. 55-60, 2007-NL-179, 2007-SLP-66, May 25, 2007—abstract.
International Search Report issued in International Application No. PCT/2019/019725, Jul. 16, 2019, 2 pages.
Office Action issued in corresponding Japanese Patent Application No. 2021-520502, Oct. 11, 2023, 6 pages w/ translation.

* cited by examiner

CLUSTER ANALYSIS METHOD, CLUSTER ANALYSIS SYSTEM, AND CLUSTER ANALYSIS PROGRAM

TECHNICAL FIELD

The present invention relates to a cluster analysis method, a cluster analysis system, and a cluster analysis program for classifying a plurality of documents into clusters according to the content of the documents and generating display data indicating a relationship between the clusters according to a time series.

BACKGROUND ART

Conventionally, in a case of analyzing a large number of documents such as academic papers and documents, a person has read the documents and classified the documents by content or created summaries. The analysis by a person takes time, and, in a case where a plurality of people perform analysis, there is a tendency that the accuracy of classification and summary creation varies depending on the experience and knowledge of the workers.

Further, complicated and highly specialized documents such as an academic paper require a high degree of expertise to understand the content. However, there is a demand that those who do not have such specialized knowledge easily acquire, understand, and utilize latest information.

For example, a cluster analysis method in which morphological analysis is performed on a technical document retrieved by concept search, a weight is added to each word obtained from the morphological analysis, each technical document is vectorized, and technical documents having close vector directions are grouped into one cluster has been proposed (for example, Patent Literature 1).

Such a technique, which allows information to be classified into clusters, is not sufficient for generating a cluster based on different time axes and understanding a relationship between clusters.

CITATION LIST

Patent Literature

Patent Literature 1: JP 2005-92443 A

SUMMARY OF INVENTION

Technical Problem

An object of the present invention is to provide a cluster analysis method, a cluster analysis system, and a cluster analysis program which allow understanding of a relationship between clusters over sets by enabling classification of a large number of documents, particularly an immense number of documents, into clusters including similar documents and grasping of a relationship with a cluster of another set, such as a time-series relationship of clusters.

Solution to Problem

That is, the present invention is a cluster analysis method in which a computer classifies a plurality of documents into clusters according to content of the documents, the cluster analysis method including a first set extracting step of extracting a first set from the plurality of documents under a first condition; a first inter-document similarity calculation step of calculating inter-document similarity between content of one document included in the first set and content of another document included in the first set, a first cluster classifying step of classifying each document into a plurality of clusters based on the inter-document similarity calculated in the first similarity calculation step in the first set, a second set extracting step of extracting a second set from the plurality of documents under a second condition different from the first condition, a second inter-document similarity calculation step of calculating inter-document similarity between content of one document included in the second set and content of another document included in the second set; a second cluster classifying step of classifying each document into a plurality of clusters based on the inter-document similarity calculated in the second similarity calculation step in the second set, an inter-cluster similarity calculation step of calculating inter-cluster similarity between a cluster classified in the first cluster classifying step and a cluster classified in the second cluster classifying step, and a cluster associating step of generating association information in which relevant clusters are linked over the first set and the second set based on the inter-cluster similarity calculated in the inter-cluster similarity calculation step.

Advantageous Effects of Invention

According to the present invention, it is possible to understand a relationship between clusters by enabling classification of a large number of documents, particularly an immense number of documents, into document groups (clusters) including similar documents and grasping of a relationship between clusters in another set, such as a relationship in time series between clusters.

DESCRIPTION OF EMBODIMENTS

Hereinafter, an embodiment of the present invention will be described with reference to the drawings.

Figure 1:
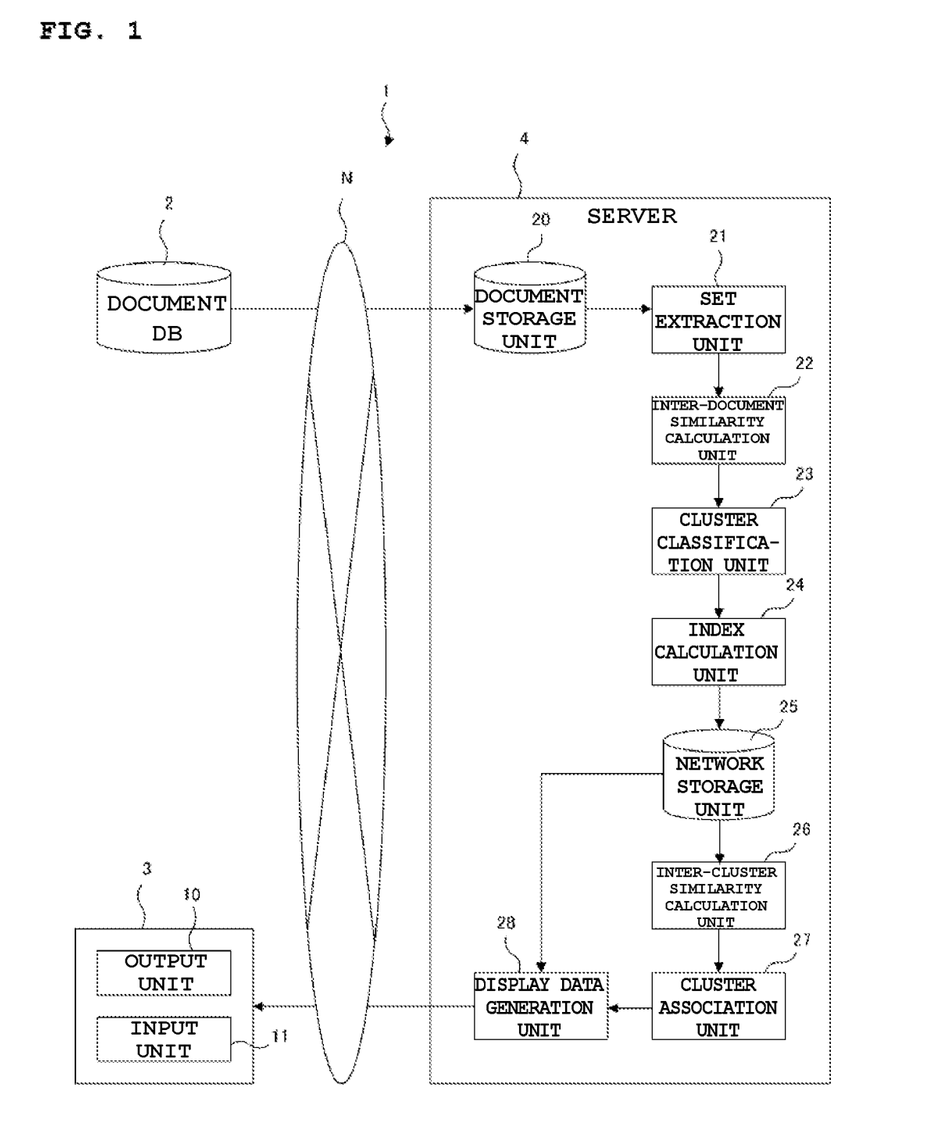
FIG. 1 is an overall configuration diagram of a cluster analysis system according to an embodiment of the present invention.

FIG. 1 is an overall configuration diagram illustrating a cluster analysis system according to the embodiment of the present invention, and a configuration of the present embodiment will be described based on the diagram.

As illustrated in FIG. 1, in a cluster analysis system 1 according to the present embodiment, a document database 2 (hereinafter, database is referred to as "DB"), an information terminal 3, and a server 4 are connected via a communication network N. The communication network N is, for example, the Internet, an intranet, a virtual private network (VPN), or the like, and is a communication network capable of bidirectionally transmitting information using a wired or wireless communication means. Further, in FIG. 1, one of the document DB 2 and one of the information terminals 3 are connected to one of the servers 4 for simplification of description. However, the server 4 can be connected to a plurality of document DBs and a plurality of the information terminals 3.

The document DB 2 is, for example, a database that stores information of documents such as academic papers, patent documents, journals, books, and newspaper articles, and discloses stored documents to a limited person or non-limited person. In the present embodiment, the document DB 2 will be described as an example of a document DB that stores information of medical literature. However, the content, fields, and types of documents that can be stored in the document DB of the present invention are not limited. In the present embodiment, the information of medical literature includes bibliographic matters such as an author name, a publication date, month, and year (time information), an affiliation of an author, a content matter of a paper such as a title, a gist, and a text of the paper, citing and cited information such as the number of citing and cited items and citing and cited document names, publication information such as an academic society name, a magazine name, or a publishing company name by which a document is published, and the like.

The information terminal 3 is, for example, a personal computer (hereinafter referred to as "PC"), or a mobile terminal such as a smartphone, a tablet PC, or a mobile phone, and includes an output unit 10 and an input unit 11.

The output unit 10 is, for example, a device such as a display or a printer, and can display the display data generated by the server 4 in a visually recognizable manner.

The input unit 11 is, for example, a device such as a keyboard or a mouse, and allows input and operation of information. The output unit 10 and the input unit 11 may integrally constitute, for example, a touch panel.

A person (user) who uses the information terminal 3 can check the display data generated by the server 4 on the output unit 10 and can issue various instructions to the server 4 via the input unit 11.

The server 4 includes one or more servers (computers) that classify a plurality of documents into clusters according to the content of the documents and generate display data indicating a relationship between each document. The server 4 includes various calculation units and storage units, and includes, for example, a document storage unit 20, a set extraction unit 21, an inter-document similarity calculation unit 22, a cluster classification unit 23, an index calculation unit 24, a network storage unit 25, an inter-cluster similarity calculation unit 26, a cluster association unit 27, and a display data generation unit 28.

Specifically, the document storage unit 20 is a storage unit that is connected to the document DB 2 via the communication network N and acquires and stores necessary information of a document from the document DB 2. For example, in the present embodiment, medical literature is acquired from the document DB 2 and stored. The document storage unit 20 also has a function of automatically updating a document in the document storage unit 20 in synchronization with updates such as addition or deletion of the document in the document DB 2.

The set extraction unit 21 has a function of extracting a set from the document storage unit 20 according to a condition using time information. For example, the set extraction unit 21 can extract a set limited to medical literatures published in a predetermined period (for example, a predetermined year) by using a publication date, month, and year of the document. As a condition of extracting a set, not only time information but also other conditions may be used or other conditions may be added. For example, conditions such as a medical literature relating to a particular disease, a medical literature published in a particular society, and the like may be used or added, or a plurality of these conditions may be used. Furthermore, the number of documents included in one set can be narrowed down to a predetermined number. Further, when a document is updated in the document storage unit 20, the set extraction unit 21 extracts a document that satisfies the condition again on the basis of information after the update.

The inter-document similarity calculation unit 22 has a function of calculating similarity between the content of one document and the content of another document for documents in a set extracted by the set extraction unit 21. For example, TF-IDF or cosine similarity can be used for calculation of the similarity. That is, the inter-document similarity calculation unit 22 extracts words used in content of each document, weights each word from a product of an appearance frequency (term frequency (TF)) in a document and rarity (inverse document frequency (IDF)) with respect to a word used in another document, and vectorizes the document. Then, the inter-document similarity calculation unit 22 calculates a value of cosine (cos) between vectorized documents as a value of similarity between the documents. The similarity is represented by a value between 0 and 1 in a manner, for example, the similarity between a first document and a second document is 0.856, the similarity between a first document and a third document is 0.732, and, the closer the similarity is to 1, the more similar the documents are.

The cluster classification unit 23 generates a network including the documents connected by a line (hereinafter referred to as "edge") based on the similarity calculated by the inter-document similarity calculation unit 22, and classifies similar documents into clusters (document groups). An algorithm for clustering is not particularly limited. For example, an algorithm (what is called the Girvan-Newman algorithm) that specifies a cluster in which connectivity between nodes is maintained as much as possible by iterative calculation even when an edge is separated can be used.

The index calculation unit 24 has a function of calculating a centrality index indicating the centrality of each document in a network generated by the cluster classification unit 23. An algorithm for calculating the centrality index is not particularly limited. For example, eigenvector centrality, PageRank, betweenness centrality, degree centrality, and the like can be used. In the present embodiment, eigenvector centrality is used. The eigenvector centrality for one document (hereinafter referred to as "node") on a network is indicated by a probability of passing through any node in the network when following an edge is repeated starting from the node.

The network storage unit 25 is a storage unit that stores network information after clustering for each set of documents extracted by the set extraction unit 21. For example, in a case where the set extraction unit 21 generates a set for each year based on publication years of documents, network information of each year is stored in the network storage unit 25. Each piece of network information stored here is converted into network display data by the display data generation unit 28, and can be displayed on the output unit 10 of the information terminal 3.

Figure 2:
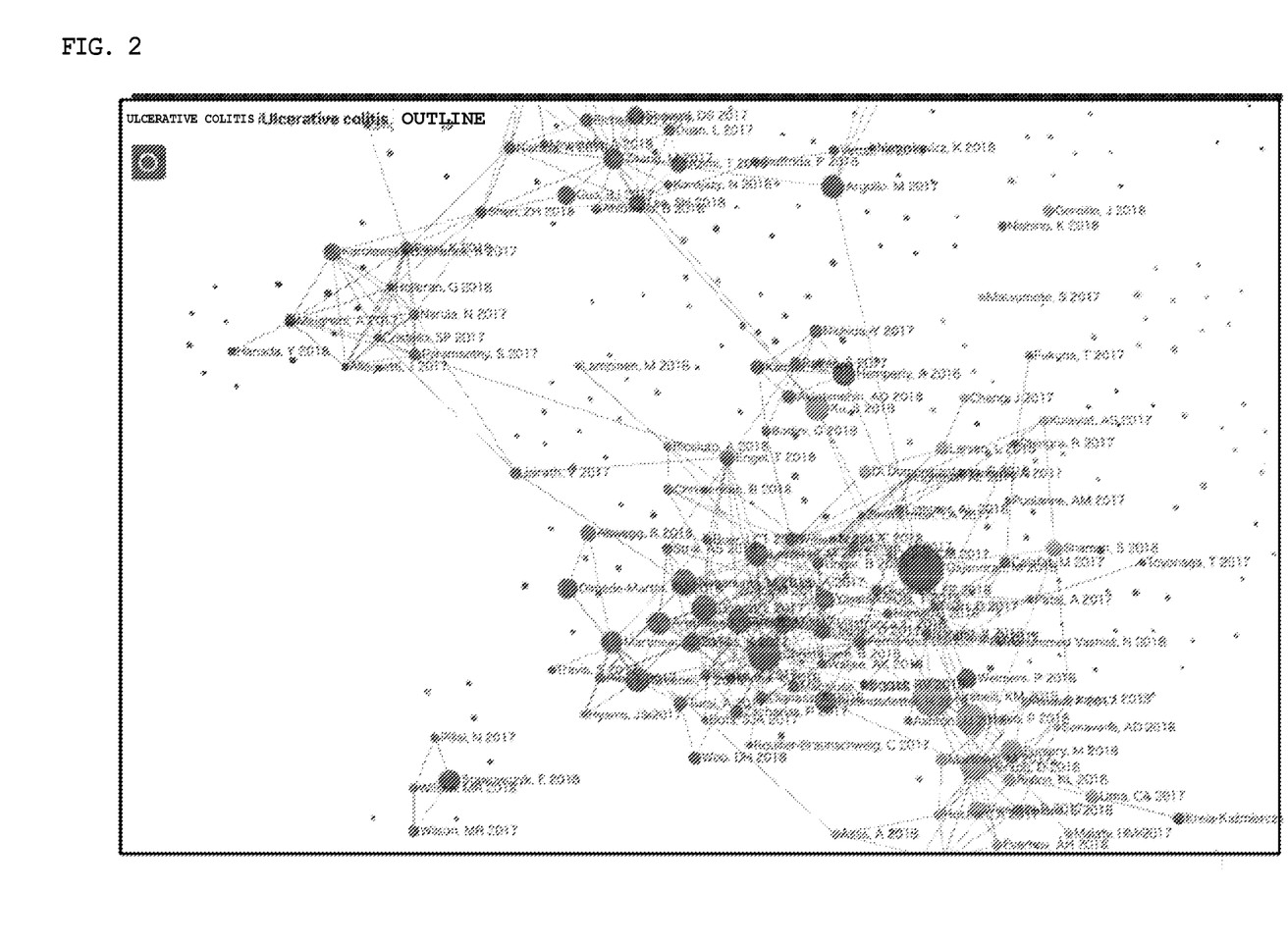
FIG. 2 is a display example of a cluster analysis result displayed on an output unit of an information terminal.
Figure 3:
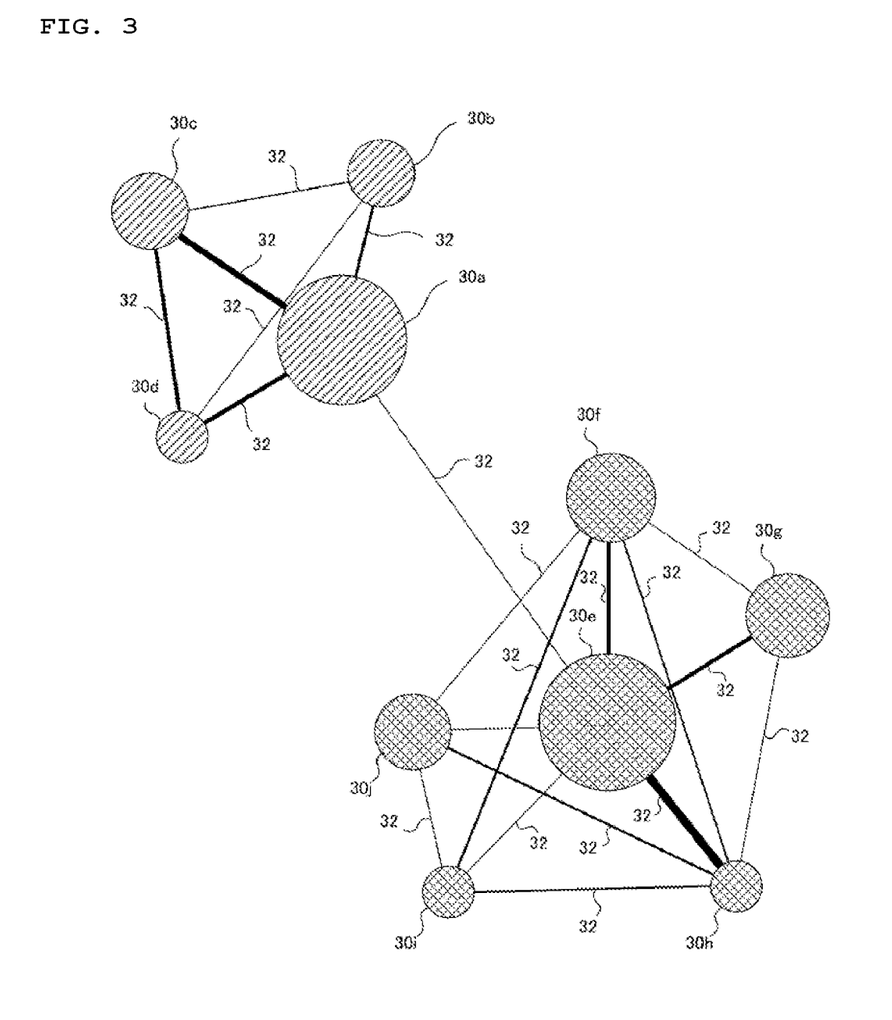
FIG. 3 is an explanatory diagram of display data.

FIG. 2 is a display example of one network as a cluster analysis result displayed on the output unit of the information terminal, and FIG. 3 is an explanatory diagram of a network. Display of a network in one set will be described with reference to these diagrams.

As illustrated in FIGS. 2 and 3, a network in one set is indicated by an expression according to the centrality index, an expression according to a type of a cluster, and an expression according to the degree of similarity between documents for each document in the set.

Specifically, as illustrated in FIG. 3, one document (node) on a network is indicated by one circle, the centrality index is expressed by the size of the circle, a type of a cluster is expressed by color, and the degree of similarity is expressed by thickness of the edge.

In FIG. 3, ten nodes 30a to 30j (hereinafter also collectively referred to as "nodes 30") are displayed, four of the nodes 30a to 30d on the upper left belong to a first cluster, and six of the nodes 30e to 30j on the lower right belong to a second cluster. Note that the first cluster and the second cluster can be represented in different colors. In FIG. 3, a difference in color is indicated by a difference in hatching.

The size of the nodes 30 indicates the degree of the centrality, and in FIG. 3, it can be seen that the node 30a and the node 30e are documents with high centrality. Further, the thickness of an edge 32 connecting the nodes 30 indicates the magnitude of the inter-document similarity connected by the edge 32. Therefore, in FIG. 3, since the edges 32 between the node 30a and the node 30c and between the node 30e and the node 30h are thick, the inter-document similarity between these nodes is shown to be high.

In the network storage unit 25, network information on which such network display is based is stored for each set.

The inter-cluster similarity calculation unit 26 has a function of calculating inter-cluster similarity between clusters of a plurality of sets stored in the network storage unit 25. For the calculation of the inter-cluster similarity, TF-IDF and cosine similarity can be used similarly to the inter-document similarity calculation unit 22. That is, the inter-cluster similarity calculation unit 26 extracts words used in the content of documents in each cluster in each set, weights each word from a product of an appearance frequency (term frequency (TF)) in a cluster and rarity (inverse document frequency (IDF)) with respect to a word used in another cluster, and vectorizes each cluster. Then, the inter-cluster similarity calculation unit 26 calculates a value of cosine (cos) between a cluster vectorized in a first set and a cluster vectorized in a second set as a value of the inter-cluster similarity.

The cluster association unit 27 has a function of generating association information of a cluster by regarding clusters having inter-cluster similarity equal to or more than a predetermined threshold as clusters having relevance to each other. That is, the cluster association unit 27 links relevant clusters over sets.

The display data generation unit 28 is capable of generating network display data based on the network information stored in the network storage unit 25 described above, and also has a function of generating time-series display data indicating a relationship between clusters over sets that are associated by the cluster association unit 27.

Figure 4:
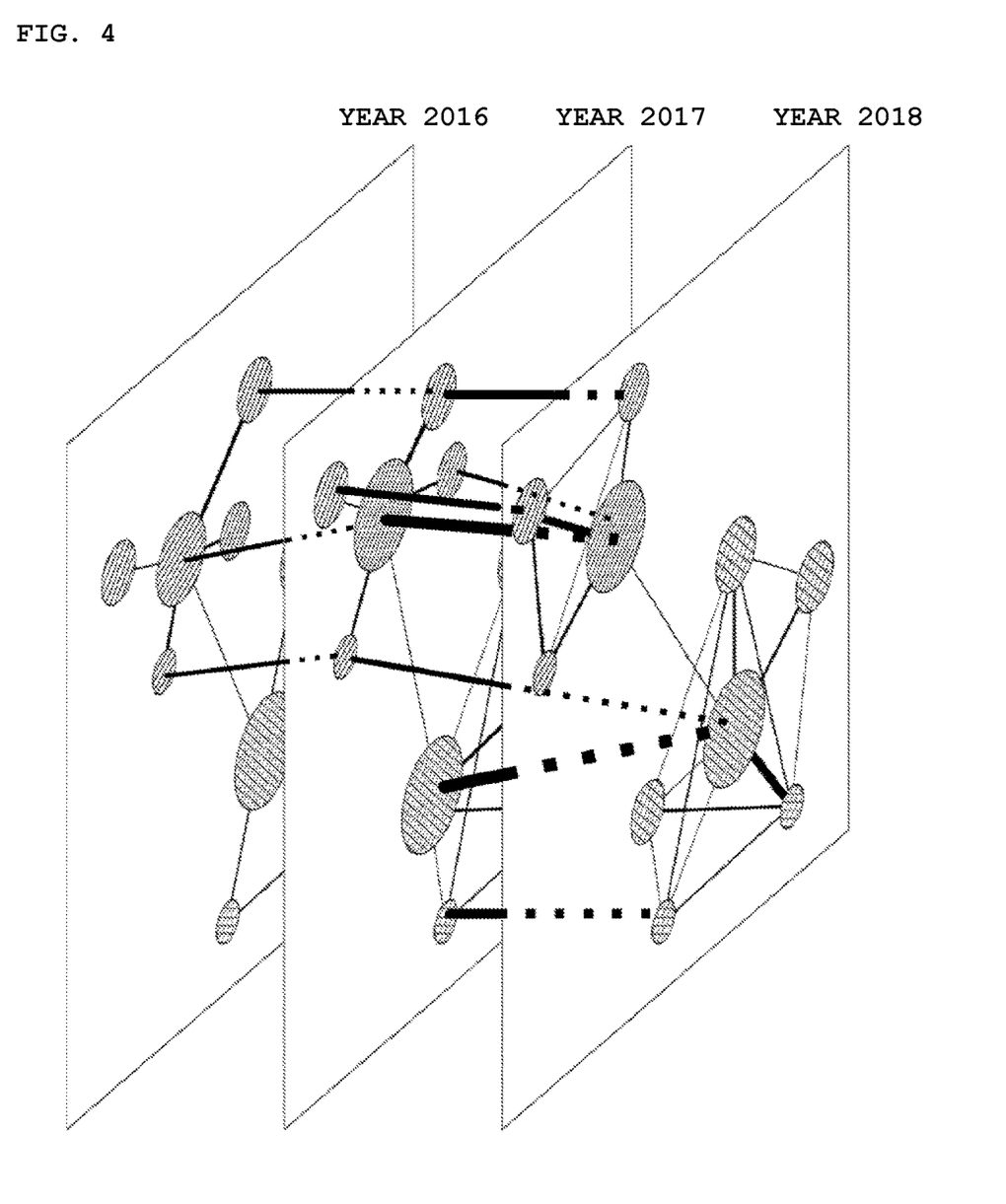
FIG. 4 is an explanatory diagram illustrating a relationship between clusters over sets.
Figure 5:
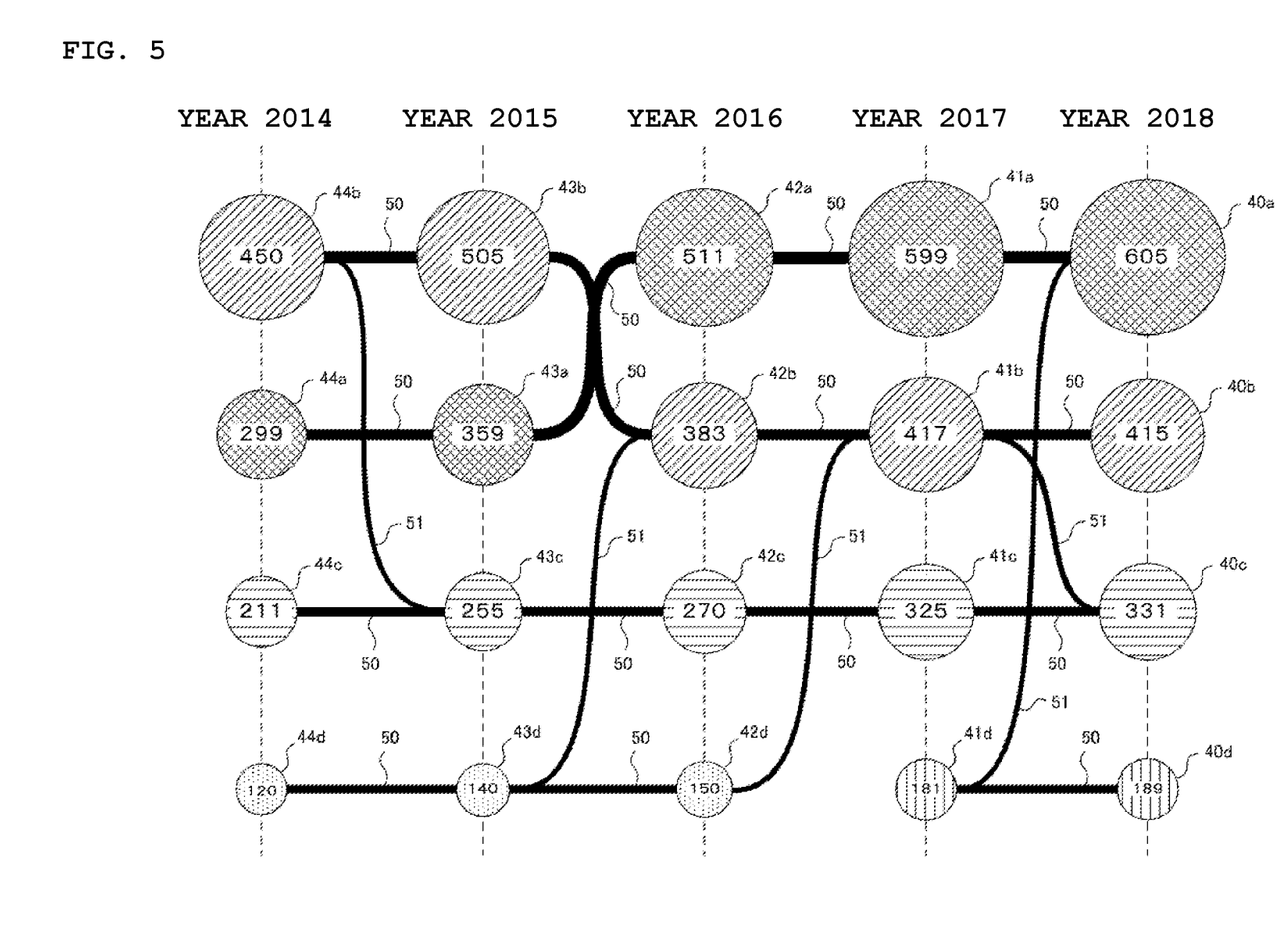
FIG. 5 is an explanatory diagram illustrating an example of a time-series map of each cluster.

FIG. 4 illustrates a relationship between clusters over sets, and FIG. 5 illustrates a display example of time-series display data.

FIG. 4 shows a network in the set shown in FIG. 3 above as an example of a network showing a set of medical literatures published in 2018. Furthermore, in FIG. 4, networks showing sets of medical literatures published in 2017 and 2016 are arranged in time series.

As indicated by a solid line and a dotted line extending between sets in FIG. 4, the inter-cluster similarity calculation unit 26 calculates the similarity between clusters over sets from the similarity between the documents in a cluster of the set of the year 2018 and the documents in a cluster of the set of the year 2017. Further, the inter-cluster similarity calculation unit 26 can calculate the similarity between clusters in time series by performing similar processing for the set of the year 2017 and the set of the year 2016.

In the time-series display in FIG. 5, major clusters belonging to sets of medical literatures published in each year from 2014 to 2018 are arranged in chronological order. The clusters are indicated by circles, the numbers of documents belonging to the clusters are expressed by the size of the circles, and the numbers described in the circles indicate the number of documents.

In FIG. 5, the clusters are associated based on the year 2018 which is the latest. Four clusters 40a to 40d with a large number of documents in the year 2018 are displayed, and the relevance with past clusters is indicated by a line (edges 50 and 51) based on the four clusters. Note that, similarly to FIG. 3, each cluster is indicated by a different color. However, in FIG. 5, a difference in color is indicated by a difference in hatching.

The thickness of the edges 50 and 51 indicates a level of the similarity between the clusters, and the display data generation unit 28 generates the display data so as to display only the similarity equal to or more than a predetermined threshold. Further, there are two types of edges: the main edge 50 connecting a cluster having the highest similarity to a reference cluster; and the sub-edge 51 connecting a cluster having the second or subsequent similarity other than the main edge 50. Clusters connected by the main edge 50 are indicated by the same color (hatching) as clusters having the same attribute. In contrast, the sub-edge 51 connects clusters having different attributes. Note that the attribute of a cluster corresponds to, for example, a research theme in a medical literature.

In this way, in a case where FIG. 4 in which the clusters of each year are connected by the edges 50 and 51 is time-series display data in a medical literature, it can be estimated as described below.

For example, the attribute of the cluster 40a, which is ranked first in the number of documents in the year 2018, is also ranked first (cluster 41a, 42a) in the years 2017 and 2016, but is ranked second (cluster 43a, 44a) in the years 2015 and 2014, and the number of documents rapidly increases from the year 2015 to 2016. For this reason, it can be estimated that although a research theme of the cluster 40a has attracted attention since before, an event attracting more attention has occurred particularly from the year 2015 to 2016.

In contrast, since the number of documents of the cluster 40b ranked second in the number of documents in the year 2018 decreases from the year 2015 to 2016, it can be estimated that a cure in a research theme of the cluster 40b was established in this period. Further, since this research theme is connected to clusters 43c and 40c, which are ranked third in the number of documents, by the sub-edge 51 from the year 2014 to 2015 and from the year 2017 to 2018, it is estimated that the research theme is branched.

Further, the cluster 40c, which is ranked third in the number of documents in the year 2018, is constantly ranked third in the number of documents from the year 2014. However, the number of documents is increasing, and it can be estimated that the cluster has a research theme that may be continuously developed in the future.

In the year 2018, the cluster 40*d*, which is ranked fourth in the number of documents, has an attribute that occurs in the year 2017, and is shown to have a relatively new research theme. Furthermore, it can be estimated that clusters 42*d*, 43*d*, and 44*d*, which are ranked fourth in the number of documents from the year 2016 to 2014, are integrated into a cluster 41*b*, which is ranked second in the number of documents in the year 2017.

In this way, by indicating the relevance between clusters over sets, the transition of the clusters can be observed.

The display data generation unit 28 transmits the generated network display data and time-series display data to the information terminal 3 connected to the server 4 via the communication network N.

In the cluster analysis system 1 configured as described above, for example, when the user inputs information related to a medical literature for a specific disease name or the like to the server 4 via the input unit 11 of the information terminal 3, the network display data as illustrated in FIGS. 2 and 3 and the time-series display data as illustrated in FIG. 5 corresponding to the input information is output from the server 4 to the output unit 10 of the information terminal 3.

Figure 6:
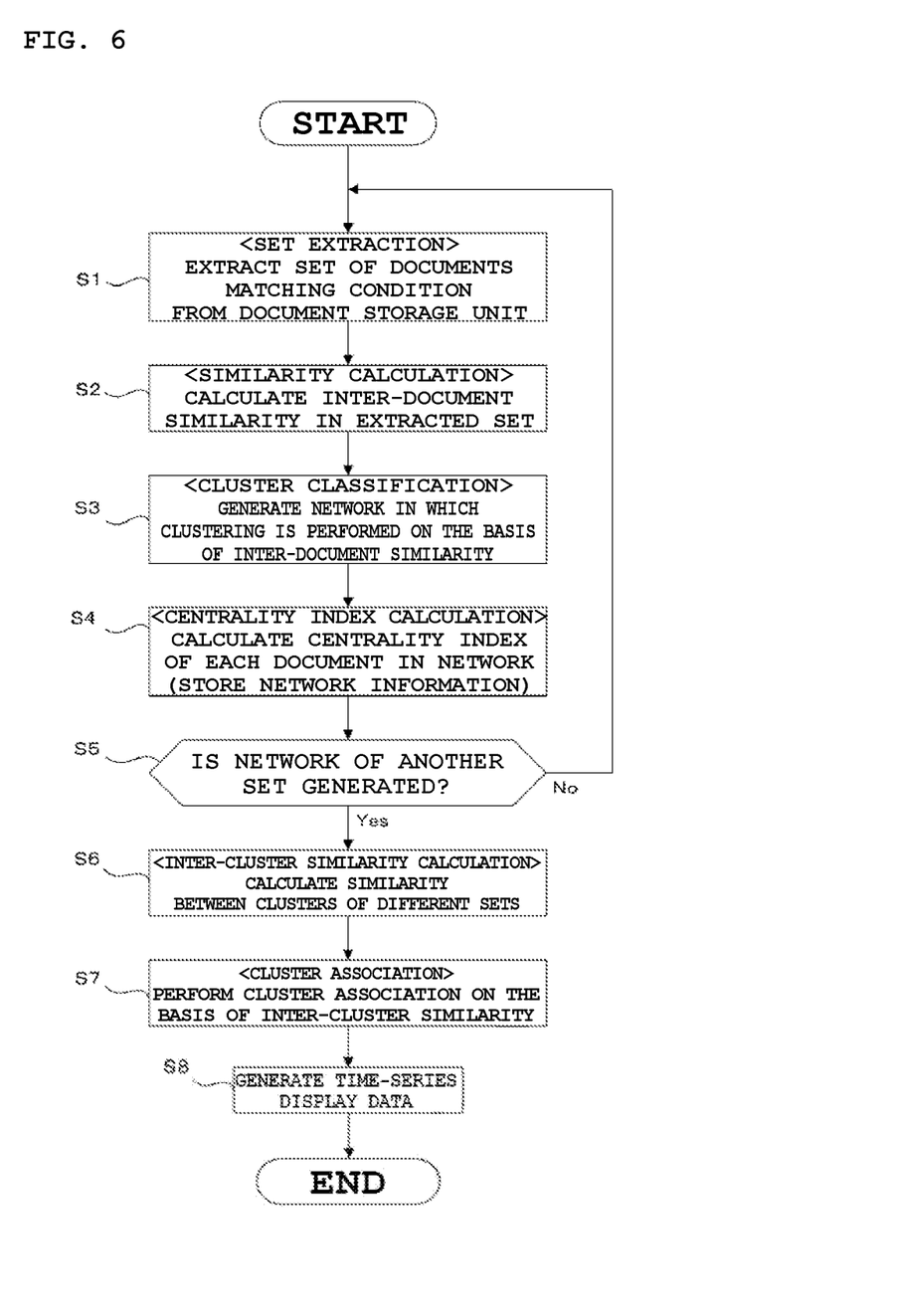
FIG. 6 is a flowchart showing a cluster analysis control routine executed by a server of the cluster analysis system according to the embodiment of the present invention.

FIG. 6 is a flowchart of a cluster analysis routine for generating the time-series display data executed by the server 4 of the cluster analysis system 1. Hereinafter, the cluster analysis method of the present embodiment will be described in detail along the flowchart.

When the server 4 receives input information such as a specific disease name, a time series period, a way of dividing a period, and the like from the information terminal 3, the set extraction unit 21 extracts a set of documents matching a condition from the document storage unit 20 in Step S1. For example, in a case where the above-described time-series display in FIG. 5 is requested, first, a set (first set) of medical literatures published in the year 2018 is extracted.

In the subsequent Step S2, the inter-document similarity calculation unit 22 calculates inter-document similarity between documents constituting the set extracted in Step S1.

In Step S3, the cluster classification unit 23 generates a network between documents on the basis of the similarity calculated in Step S2, and performs classification so that a set of similar documents constitute a cluster.

In Step S4, the index calculation unit 24 calculates the centrality index indicating the centrality of the documents in the network generated in Step S3. In this manner, the network information related to the set extracted in Step S1 is generated and stored in the network storage unit 25.

In Step S5, the inter-cluster similarity calculation unit 26 determines whether a network of sets meeting a condition is stored in the network storage unit 25. When the determination result is false (No), the processing returns to Step S1. For example, in the case of the time-series display in FIG. 5 described above, in a case where a network has not been generated for a set of years from 2014 to 2018, the processing returns to Step S1, a set of years that a network has not been generated are extracted, and a network is generated by execution of Steps S2 to S4 described above.

In a case where the determination result of Step S5 is true (Yes), that is, in a case where a network of sets meeting the condition is generated, the processing proceeds to Step S6.

In Step S6, the inter-cluster similarity calculation unit 26 calculates inter-cluster similarity between clusters of a plurality of sets stored in the network storage unit 25. For example, in the case of the time-series display in FIG. 5, inter-cluster similarity between clusters of a set of the years 2018 and 2017 is calculated, and then inter-cluster similarity between clusters of a set of the years 2017 and 2016, 2016 and 2015, and 2015 and 2014 is calculated.

In Step S7, the cluster association unit 27 generates association information of a cluster by regarding clusters having inter-cluster similarity equal to or more than a predetermined threshold as clusters having relevance to each other. For example, in the case of the time-series display in FIG. 5, clusters having inter-cluster similarity equal to or more than the predetermined threshold are connected by the edges 50 and 51 between clusters in each year.

In Step S8, the display data generation unit 28 generates the time-series data as illustrated in FIG. 5, transmits the time-series data to the information terminal 3, and ends the routine.

As described above, in the cluster analysis system 1 according to the present embodiment, a plurality of sets having different temporal conditions are extracted, a network is formed on the basis of the inter-document similarity in the sets, clusters of similar documents are formed, and inter-cluster similarity is calculated, so that the clusters are associated over the sets. This makes it possible to show temporal transition of the clusters.

Further, in the association of clusters, unnecessary information can be reduced by targeting a cluster having inter-cluster similarity equal to or more than a predetermined threshold, the burden of processing on the server 4 can be reduced, and an information amount to the information terminal 3 can be reduced.

Furthermore, by generating the time-series display data indicating a relationship between clusters over sets that are associated as illustrated in FIG. 5, it is possible to obtain a bird's eye view of transition of the clusters.

As described above, according to the present embodiment, it is possible to understand as far as the background between clusters by enabling classification of a large number of documents, particularly an immense number of documents, into clusters including similar documents and grasping of a relationship in time series between the clusters.

Although an embodiment of the present invention is specifically described above, it is to be understood that the present invention is not limited to the embodiment, and various changes and modifications in the embodiment can be made by those skilled in the art without departing from the scope or spirit of the present invention as defined in the appended claims.

In the above embodiment, as illustrated in FIG. 5, the display data generation unit 28 expresses a cluster by a circle, the number of documents by the size of the circle, and inter-cluster similarity by the thickness of the edge in the time-series display. However, the expression of the time-series display is not limited to the above, and may be expressed by other expressions.

Further, in the cluster analysis system 1 according to the above embodiment, a time-series relationship between each cluster over sets can be grasped by using the time information as a condition for extracting a set. However, the condition for extracting a set is not limited to the time information. For example, in the case of a medical literature, it is possible to visualize the relevance between clusters related to a disease and a pharmaceutical by extracting a set under a condition of a type of a disease and a type of a pharmaceutical as a target. Alternatively, in the case of technical literature, it is possible to visualize the relevance between clusters related to a specific technique by extracting a set under the condition of a technical field. By making it possible to grasp a relationship between clusters in various sets according to a condition for extracting a set as described above, a relationship between corresponding clusters in different sets can be understood.

REFERENCE SIGNS LIST

1 Cluster analysis system
2 Document DB
3 Information terminal
4 Server
10 Output unit
11 Input unit
20 Document storage unit
21 Set extraction unit
22 Inter-document similarity calculation unit
23 Cluster classification unit
24 Index calculation unit
25 Network storage unit
26 Inter-cluster similarity calculation unit
27 Cluster association unit
28 Display data generation unit

The invention claimed is:

1. A cluster analysis method in which a computer classifies a plurality of documents into clusters according to content of the plurality of documents, the cluster analysis method comprising:
a first set extracting step of extracting a first set from the plurality of documents under a first condition;
a first inter-document similarity calculation step of calculating inter-document similarity between content of one document included in the first set and content of another document included in the first set;
a first cluster classifying step of classifying each document into a plurality of clusters based on the inter-document similarity calculated in the first similarity calculation step in the first set;
a second set extracting step of extracting a second set from the plurality of documents under a second condition different from the first condition;
a second inter-document similarity calculation step of calculating inter-document similarity between content of one document included in the second set and content of another document included in the second set;
a second cluster classifying step of classifying each document into a plurality of clusters based on the inter-document similarity calculated in the second similarity calculation step in the second set;
an inter-cluster similarity calculation step of calculating inter-cluster similarity between a cluster classified in the first cluster classifying step and a cluster classified in the second cluster classifying step;
a cluster associating step of generating association information in which relevant clusters are linked over the first set and the second set based on the inter-cluster similarity calculated in the inter-cluster similarity calculation step; and
a display data generation step comprising:
generating display data indicating that clusters having relevance over the first set and the second set are connected by a line, and
generating display data in which the cluster is expressed by a circle, a number of documents belonging to the cluster is expressed by a size of the circle, and the inter-cluster similarity is expressed by thickness of the line.

2. The cluster analysis method according to claim 1, wherein time information is linked to the plurality of documents, and the first condition and the second condition include a condition using the time information.

3. The cluster analysis method according to claim 1, wherein in the cluster associating step, clusters having inter-cluster similarity calculated in the inter-cluster similarity calculation step of a predetermined threshold or more are linked to each other.

4. The cluster analysis method according to claim 1, wherein the display data generating step further comprises generating display data indicating a relationship between the clusters over sets that are associated in the cluster associating step.

5. The cluster analysis method according to claim 4, wherein the display data generation step further comprises generating display data in which a cluster of the first set and a cluster of the second set are arranged in time-series order.

6. A cluster analysis method in which a computer classifies a plurality of documents into clusters according to content of the plurality of documents, the cluster analysis method comprising:
an inter-cluster similarity calculation step of calculating inter-cluster similarity between a cluster classified in a first set extracted from the plurality of documents and a cluster classified in a second set different from the first set extracted from the plurality of documents; and
a cluster associating step of generating association information in which relevant clusters are linked over the first set and the second set based on the inter-cluster similarity calculated in the inter-cluster similarity calculation step; and
a display data generation step comprising:
generating display data indicating clusters having relevance over the first set and the second set being connected by a line, and
generating display data in which the cluster is expressed by a circle, a number of documents belonging to the cluster is expressed by a size of a circle, and the inter-cluster similarity is expressed by thickness of the line.

* * * * *